US009500242B2

(12) United States Patent
Monsere et al.

(10) Patent No.: US 9,500,242 B2
(45) Date of Patent: Nov. 22, 2016

(54) COMPONENT WITH INLAY FOR DAMPING VIBRATIONS

(75) Inventors: Patrick J. Monsere, Highland, MI (US); Mark T. Riefe, Brighton, MI (US); David B. Antanaitis, Northville, MI (US); Brent D. Lowe, Milford, MI (US); Mohan Sundar, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1736 days.

(21) Appl. No.: 12/328,989

(22) Filed: Dec. 5, 2008

(65) Prior Publication Data

US 2010/0140033 A1 Jun. 10, 2010

(51) Int. Cl.
| F16F 7/00 | (2006.01) |
| F16D 65/10 | (2006.01) |
| F16D 65/00 | (2006.01) |
| F16D 65/02 | (2006.01) |
| F16D 69/00 | (2006.01) |

(52) U.S. Cl.
CPC ........... *F16D 65/10* (2013.01); *F16D 65/0006* (2013.01); *F16D 2065/132* (2013.01); *F16D 2069/002* (2013.01); *F16D 2250/0015* (2013.01); *F16D 2250/0046* (2013.01); *F16D 2250/0076* (2013.01)

(58) Field of Classification Search
CPC .................. F16D 65/10; F16D 65/0006; F16D 2065/132; F16D 2069/002; F16D 2250/0015; F16D 2250/0046; F16D 2250/0076
See application file for complete search history.

(56) References Cited

U.S. PATENT DOCUMENTS

| 974,024 | A | | 10/1910 | Carter | |
| 1,484,421 | A | | 2/1924 | Thomspon | |
| 1,678,777 | A | * | 7/1928 | Hansen et al. | 188/218 R |
| 1,727,486 | A | * | 9/1929 | Sauzedde | 188/218 R |
| 1,745,301 | A | | 1/1930 | Johnston | |
| 1,746,494 | A | * | 2/1930 | Norton | 188/218 R |
| 1,780,234 | A | * | 11/1930 | Johnston | 188/218 A |
| 1,989,211 | A | | 1/1935 | Norton | |
| 2,012,838 | A | | 8/1935 | Tilden | |
| 2,026,878 | A | | 1/1936 | Farr | |

(Continued)

FOREIGN PATENT DOCUMENTS

| CH | 428319 A | 1/1967 |
| CN | 20051113784 A | 10/2005 |

(Continued)

OTHER PUBLICATIONS

Chinese First Office Action; CN200510113784.X; Dated May 18, 2007; 19 pages.

(Continued)

*Primary Examiner* — Xuan Lan Nguyen
(74) *Attorney, Agent, or Firm* — BrooksGroup

(57) ABSTRACT

An exemplary embodiment includes an automotive brake component, such as a brake drum or a brake rotor, and an inlay coupled to the automotive brake component. The inlay constituting at least a portion of a braking surface that is acted upon during a braking event. The inlay damping vibrations in the automotive brake component when the component is vibrated.

17 Claims, 1 Drawing Sheet

(56) References Cited

U.S. PATENT DOCUMENTS

| | | | |
|---|---|---|---|
| 2,288,438 A | 6/1942 | Dach | |
| 2,603,316 A | 7/1952 | Pierce | |
| 2,978,073 A * | 4/1961 | Soddy | 188/218 R |
| 2,978,793 A | 4/1961 | Lamson et al. | |
| 3,005,259 A * | 10/1961 | Benya et al. | 29/505 |
| 3,007,553 A * | 11/1961 | Sinclair et al. | 188/218 R |
| 3,043,631 A * | 7/1962 | Swoboda | 301/6.3 |
| 3,085,391 A | 4/1963 | Hatfield et al. | |
| 3,090,114 A * | 5/1963 | Sinclair | 29/447 |
| 3,113,647 A * | 12/1963 | Tuttle | 188/218 R |
| 3,147,828 A | 9/1964 | Hunsaker | |
| 3,292,746 A | 12/1966 | Robinette | |
| 3,378,115 A | 4/1968 | Stephens, III | |
| 3,401,736 A * | 9/1968 | Imagawa | 164/95 |
| 3,425,523 A | 2/1969 | Robinette | |
| 3,475,634 A | 10/1969 | Bogdanov et al. | |
| 3,509,973 A | 5/1970 | Kimata | |
| 3,575,270 A | 4/1971 | Reinbek et al. | |
| 3,774,472 A | 11/1973 | Mitchell | |
| 3,841,448 A | 10/1974 | Norton, Jr. | |
| 3,975,894 A | 8/1976 | Suzuki | |
| 4,049,085 A | 9/1977 | Blunier | |
| 4,072,219 A | 2/1978 | Hahm et al. | |
| 4,195,713 A | 4/1980 | Hagbjer et al. | |
| 4,250,950 A | 2/1981 | Buxmann et al. | |
| 4,266,638 A * | 5/1981 | Petersen et al. | 188/218 R |
| 4,278,153 A | 7/1981 | Venkatu | |
| 4,338,758 A | 7/1982 | Hagbjer | |
| 4,379,501 A | 4/1983 | Hagiwara et al. | |
| 4,523,666 A | 6/1985 | Murray | |
| 4,529,079 A | 7/1985 | Albertson | |
| 5,004,078 A | 4/1991 | Oono et al. | |
| 5,025,547 A | 6/1991 | Sheu et al. | |
| 5,083,643 A | 1/1992 | Hummel et al. | |
| 5,115,891 A | 5/1992 | Raitzer et al. | |
| 5,139,117 A | 8/1992 | Melinat | |
| 5,143,184 A | 9/1992 | Snyder et al. | |
| 5,184,663 A | 2/1993 | Oono | |
| 5,259,486 A | 11/1993 | Deane | |
| 5,310,025 A | 5/1994 | Anderson | |
| 5,416,962 A | 5/1995 | Passarella | |
| 5,417,313 A | 5/1995 | Matsuzaki et al. | |
| 5,509,510 A | 4/1996 | Ihm | |
| 5,539,213 A | 7/1996 | Meeks et al. | |
| 5,582,231 A | 12/1996 | Siak et al. | |
| 5,620,042 A | 4/1997 | Ihm | |
| 5,660,251 A | 8/1997 | Nishizawa et al. | |
| 5,789,066 A | 8/1998 | De Mare et al. | |
| 5,819,882 A | 10/1998 | Reynolds et al. | |
| 5,855,257 A | 1/1999 | Wickert et al. | |
| 5,862,892 A | 1/1999 | Conley | |
| 5,878,843 A | 3/1999 | Saum | |
| 5,927,447 A | 7/1999 | Dickerson | |
| 5,965,249 A | 10/1999 | Sutton et al. | |
| 6,047,794 A | 4/2000 | Nishizawa | |
| 6,073,735 A | 6/2000 | Botsch | |
| 6,112,865 A | 9/2000 | Wickert et al. | |
| 6,206,150 B1 | 3/2001 | Hill | |
| 6,216,827 B1 | 4/2001 | Ichiba et al. | |
| 6,223,866 B1 | 5/2001 | Giacomazza | |
| 6,231,456 B1 | 5/2001 | Rennie et al. | |
| 6,241,055 B1 | 6/2001 | Daudi | |
| 6,241,056 B1 | 6/2001 | Cullen et al. | |
| 6,283,258 B1 | 9/2001 | Chen et al. | |
| 6,302,246 B1 | 10/2001 | Naumann et al. | |
| 6,357,557 B1 | 3/2002 | Di Ponio | |
| 6,405,839 B1 | 6/2002 | Ballinger et al. | |
| 6,465,110 B1 | 10/2002 | Boss et al. | |
| 6,481,545 B1 | 11/2002 | Yano et al. | |
| 6,505,716 B1 | 1/2003 | Daudi et al. | |
| 6,507,716 B2 | 1/2003 | Nomura et al. | |
| 6,530,458 B1 * | 3/2003 | Rau, III | 188/218 R |
| 6,543,518 B1 | 4/2003 | Bend et al. | |
| 6,648,055 B1 | 11/2003 | Haug et al. | |
| 6,799,664 B1 | 10/2004 | Connolly | |
| 6,880,681 B2 | 4/2005 | Koizumi et al. | |
| 6,890,218 B2 | 5/2005 | Patwardhan et al. | |
| 6,899,158 B2 | 5/2005 | Matuura et al. | |
| 6,932,917 B2 | 8/2005 | Golden et al. | |
| 6,945,309 B2 | 9/2005 | Frait et al. | |
| 7,066,235 B2 | 6/2006 | Huang | |
| 7,112,749 B2 | 9/2006 | DiPaola et al. | |
| 7,178,795 B2 | 2/2007 | Huprikar et al. | |
| 7,293,755 B2 | 11/2007 | Miyahara et al. | |
| 7,594,568 B2 | 9/2009 | Hanna et al. | |
| 7,604,098 B2 | 10/2009 | Dessouki et al. | |
| 7,644,750 B2 | 1/2010 | Schroth et al. | |
| 7,775,332 B2 | 8/2010 | Hanna et al. | |
| 7,823,763 B2 | 11/2010 | Sachdev et al. | |
| 7,836,938 B2 | 11/2010 | Agarwal et al. | |
| 7,937,819 B2 | 5/2011 | Hanna et al. | |
| 7,938,378 B2 | 5/2011 | Hanna et al. | |
| 2002/0084156 A1 | 7/2002 | Ballinger et al. | |
| 2002/0104721 A1 | 8/2002 | Schaus et al. | |
| 2003/0037999 A1 | 2/2003 | Tanaka et al. | |
| 2003/0127297 A1 | 7/2003 | Smith et al. | |
| 2003/0141154 A1 | 7/2003 | Rancourt et al. | |
| 2003/0213658 A1 | 11/2003 | Baba | |
| 2004/0031581 A1 | 2/2004 | Herreid et al. | |
| 2004/0045692 A1 | 3/2004 | Redemske | |
| 2004/0074712 A1 | 4/2004 | Quaglia et al. | |
| 2004/0084260 A1 | 5/2004 | Hoyte et al. | |
| 2004/0242363 A1 | 12/2004 | Kohno et al. | |
| 2005/0011628 A1 | 1/2005 | Frait et al. | |
| 2005/0150222 A1 | 7/2005 | Kalish et al. | |
| 2005/0183909 A1 | 8/2005 | Rau, III et al. | |
| 2005/0193976 A1 | 9/2005 | Suzuki et al. | |
| 2006/0076200 A1 | 4/2006 | Dessouki et al. | |
| 2006/0243547 A1 | 11/2006 | Keller | |
| 2007/0039710 A1 | 2/2007 | Newcomb | |
| 2007/0056815 A1 | 3/2007 | Hanna et al. | |
| 2007/0062664 A1 | 3/2007 | Schroth et al. | |
| 2007/0062768 A1 | 3/2007 | Hanna et al. | |
| 2007/0142149 A1 | 6/2007 | Kleber | |
| 2007/0166425 A1 | 7/2007 | Utsugi | |
| 2007/0235270 A1 | 10/2007 | Miskinis et al. | |
| 2007/0298275 A1 | 12/2007 | Carter et al. | |
| 2008/0099289 A1 | 5/2008 | Hanna et al. | |
| 2008/0185249 A1 | 8/2008 | Schroth et al. | |
| 2009/0032569 A1 | 2/2009 | Sachdev et al. | |
| 2009/0107787 A1 | 4/2009 | Walker et al. | |

FOREIGN PATENT DOCUMENTS

| | | | |
|---|---|---|---|
| CN | 1757948 A | | 4/2006 |
| CN | 2863313 Y | | 1/2007 |
| DE | 2446938 A1 | | 4/1976 |
| DE | 2537038 A1 | | 3/1977 |
| DE | 19649919 A1 | | 6/1998 |
| DE | 19948009 C1 | | 3/2001 |
| DE | 60000008 T2 | | 3/2002 |
| DE | 10141698 A1 | | 3/2003 |
| DE | 102005048258 A1 | | 4/2006 |
| DE | 60116780 T2 | | 11/2006 |
| EP | 0205713 A1 | | 12/1986 |
| GB | 1230274 | | 4/1971 |
| GB | 2328952 A | | 3/1991 |
| JP | 53112672 | | 9/1978 |
| JP | 57154533 A | | 9/1982 |
| JP | 58217833 | | 12/1983 |
| JP | 1126434 U1 | | 8/1989 |
| JP | 05-104567 | | 4/1993 |
| JP | 05187466 A * | 7/1993 | F16D 65/10 |
| JP | 11342461 A | | 12/1999 |
| JP | 2003214465 A | | 7/2003 |
| JP | 2004011841 A | | 1/2004 |
| KR | 20010049837 A | | 6/2001 |
| KR | 2004038091 A * | | 5/2004 |
| WO | 9823877 A1 | | 6/1998 |

(56) References Cited

FOREIGN PATENT DOCUMENTS

| WO | 0136836 A1 | 5/2001 |
|---|---|---|
| WO | 2007035206 A2 | 3/2007 |

OTHER PUBLICATIONS

Chinese Second Office Action; CN200510113784.X; Dated Feb. 15, 2008; 13 pages.
German Examination Report; DE102005048258.9-12; Dated Oct. 22, 2007; 8 pages.
Gerdemann, Steven J,; Titanium Process Technologies; Advanced Materials & Processes, Jul. 2001, pp. 41-43.
Mahoney, M. W. & Lynch S. P.; Friction-Stir Processing; 15 pages.
MPIF: All You Need to Know about Powder Metallurgy; http://www.mpif.org/IntroPM/intropm/asp?linkid=1; 8 pages.
Powder Metallurgy—Wikipedia article; http://en.wikipedia.org/wiki/Powder_metallurgy; 5 pages.
Sintering—Wikipedia article; http://en.wikipedia.org/wiki/Sintering; 2 pages.
Magnetorheological fluid—Wikipedia article; http:en/wikipedia.org/wiki/Magnetorheological_fluid.
PCT/US2008/087354 Written Opinion and Search Report; Date of Mailing: Aug. 3, 2009; 9 pages.
PCT/US2009/039839 Written Opinion and Search Report; Date of Mailing: Nov. 24, 2009; 7 pages.
PCT/US2009/048424 Written Opinion and Search Report; Date of Mailing; Dec. 28, 2009; 7 pages.
U.S. Appl. No. 12/328,989, filed Dec. 5, 2008; First Named Inventor: Patrick J. Monsere.
U.S. Appl. No. 12/420,259, filed Apr. 8, 2009; First Named Inventor: Michael D. Hanna.
U.S. Appl. No. 12/434,057, filed May 1, 2009; First Named Inventor: Chongmin Kim.
U.S. Appl. No. 12/436,830, filed May 7, 2009; First Named Inventor: James G. Schroth.
U.S. Appl. No. 12/489,901, filed Jun. 23, 2009; First Named Inventor: Michael D. Hanna.
U.S. Appl. No. 12/885,813, filed Sep. 20, 2010; First Named Inventor: Michael D. Hanna.
PCT/US2006/029687 Search Report and Written Opinion; PCT/ISA/210 & PCT/ISA/237; Mailed Apr. 2, 2007; 6 pages.
Anyalebechi, P.N.; "Undulatory Solid Shell Growth of Aluminum Alloy 3003 . . . "; Materials Processing Fundamentals, TMS, 2007, pp. 31-45.
Anyalebechi, P.N.; "Ungrooved Mold Surface Topograpy Effects on Cast Subsurface Microstructure"; Materials Processing Fundamentals, TMS, 2007, pp. 49-67.
Dessouki et al. Disc Brake Squeal: Diagnosis and Prevention; Society of Automotive Engineers, 2002, 7 pages.
Hector et al., "Focused Energy Beam Work Roll Surface Texturing Science and Technology"; Journal of Material Processing & Manufacturing Science, vol. 2, Jul. 1993; pp. 63-119.
Lee et al., "Titanium Dioxide Nanotube Arrays Fabricated by Anodizing Processes"; Journal of the Electrochemical Society, 153 (11) 2006, pp. 499-505.
Sieber et al., "Porous Tantalum Oxide Prepared by Electrochemical Anodic Oxidation"; Journal of the Electrochemical Society, 152 (9) 2005, pp. 639-644.
Tanaka et al., In situ Measurement of the Diameter of Nanopores in Silicon during Anodization in Hydrofluoric Acid Solution; Journal of the Electrochemical Society; 151 (6) 2004, pp. 439-445.
Yigit et al., "Critical Wavelengths for Gap Nucleation in Solidification—Part I: Theoretical Methodology"; ASME, vol. 67, Mar. 2000, pp. 66-77.
U.S. Appl. No. 10/961,813, filed Oct. 8, 2004; Inventor: Omar S. Dessouki.
U.S. Appl. No. 11/554,234, filed Oct. 30, 2006; Inventor: Michael D. Hanna.
U.S. Appl. No. 11/680,179, filed Feb. 28, 2007; Inventor: Jon T. Carter.
U.S. Appl. No. 11/780,679, filed Jul. 20, 2007; Inventor: Michael D. Hanna.
U.S. Appl. No. 11/848,732, filed Aug. 31, 2007; Inventor: Richard M. Kleber.
U.S. Appl. No. 11/858,596, filed Sep. 20, 2007; Inventor: Houchun Xia.
U.S. Appl. No. 11/926,798, filed Oct. 29, 2007; Inventor: Michael J. Walker.
U.S. Appl. No. 11/969,259, filed Jan. 4, 2008; Inventor: Jan H. Aase.
U.S. Appl. No. 12/025,967, filed Feb. 5, 2008; Inventor: James G. Schroth.
U.S. Appl. No. 12/105,411, filed Apr. 18, 2008; Inventor: Mark A. Golden.
U.S. Appl. No. 12/105,438, filed Apr. 18, 2008; Inventor: John C. Ulicny.
U.S. Appl. No. 12/165,729, filed Jul. 1, 2008; Inventor: Michael D. Hanna.
U.S. Appl. No. 12/165,731, filed Jul. 1, 2008; Inventor: Michael D. Hanna.
U.S. Appl. No. 12/174,163, filed Jul. 16, 2008; Inventor: Michael D. Hanna.
U.S. Appl. No. 12/174,223, filed Jul. 16, 2008; Inventor: Michael D. Hanna.
U.S. Appl. No. 12/174,320, filed Jul. 16, 2008; Inventor: Brent D. Lowe.
U.S. Appl. No. 12/183,104, filed Jul. 31, 2008; Inventor: Michael D. Hanna.
U.S. Appl. No. 12/183,180; filed Jul. 31, 2008; Inventor: Michael D. Hanna.
U.S. Appl. No. 12/187,872, filed Aug. 7, 2008; Kenichi Kimura.
U.S. Appl. No. 12/272,164, filed Nov. 17, 2008; Inventor: Michael D. Hanna.

* cited by examiner

COMPONENT WITH INLAY FOR DAMPING VIBRATIONS

TECHNICAL FIELD

The technical field generally relates to components such as drum brake assemblies, and the construction and structure of drums for drum brake assemblies.

BACKGROUND

Automobiles commonly have brake components such as drum brake assemblies on their rear wheels to help slow or stop the automobile. A drum brake assembly includes a drum that is mounted to and rotates with a wheel and that generates friction with a braking component, such as a brake pad, during a braking event to slow or stop the automobile. Drums are typically made of steel or cast-iron, and can become worn over time, or can vibrate.

SUMMARY OF EXEMPLARY EMBODIMENTS OF THE INVENTION

One exemplary embodiment includes a product which may include a drum and one or more inlays. The drum is used in a drum brake assembly, and may have a web portion and a hoop portion extending therefrom. The one or more inlays may be located at the hoop portion and, during a braking event, may constitute at least a portion of a braking surface that comes into contact with a braking component such as a brake pad. The one or more inlays may help damp the vibrations in the drum when the drum is vibrated during use.

Another exemplary embodiment includes a product which may include a drum and one or more inlays. The drum is used in a drum brake assembly, and may be made of a first material and may have a hoop portion. The one or more inlays may be located at the hoop portion and may be made of a second material that is different than the first material. In use, the one or more inlays may constitute at least a majority of a braking surface that comes into contact with a braking component such as a brake pad. Also, relative movement between the drum and the one or more inlays may help damp vibrations in the drum when the drum is vibrated, such as during a braking event.

Another exemplary embodiment includes a method of making a product. The method may include placing an inlay in a mold cavity. The method may also include positioning the inlay to one side of the mold cavity so that, when the product is finished, the inlay may constitute an exposed braking surface that comes into contact with a braking component such as a brake pad during use. The method may further include filling the mold cavity with a molten material that, when solidified, is a drum used in a drum brake assembly. The drum may have a web portion and a hoop portion extending from the web portion, and the inlay may be located at the hoop portion.

Another exemplary embodiment includes a product which may include an automotive brake component and an inlay. The inlay may be coupled to the automotive brake component. The inlay may constitute at least a portion of a braking surface that is acted upon during a braking event. The inlay may help damp vibrations in the automotive brake component when the automotive brake component is vibrated.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

The figures illustrate several exemplary embodiments of a drum 10 that is part of a drum brake assembly for an automobile. The drum 10 may include one or more inlays 12 that may, among other things, help damp or otherwise dissipate vibrations in the drum, give better wear-resistance to the drum, reduce the weight of the drum, and speed up the manufacturing process of the drum. As shown, the drum 10 has a generally cylindrical shape which naturally defines a number of directions with respect to that shape. In this regard, the term "axially" as used herein describes a direction that generally corresponds to an imaginary center axis A (FIG. 2), and the term "circumferentially" as used herein describes a direction that generally corresponds to an imaginary circumference about the center axis A.

Though described in the context of the brake drum assembly, the inlay 12 may be used in other applications including, but not limited to, automotive components such as brake rotors, electric motors, transmission housings, gear housings, exhaust manifolds, cylindrical heads, brackets, and other components that are subject to vibrations during use. In the brake rotor example, the inlay 12 may be coupled to a cheek portion thereof in order to constitute an exposed braking surface of the cheek portion. The term "automotive brake component" includes components of an automotive braking system such as the drum 10 and the brake rotor.

Figures 1, 3:
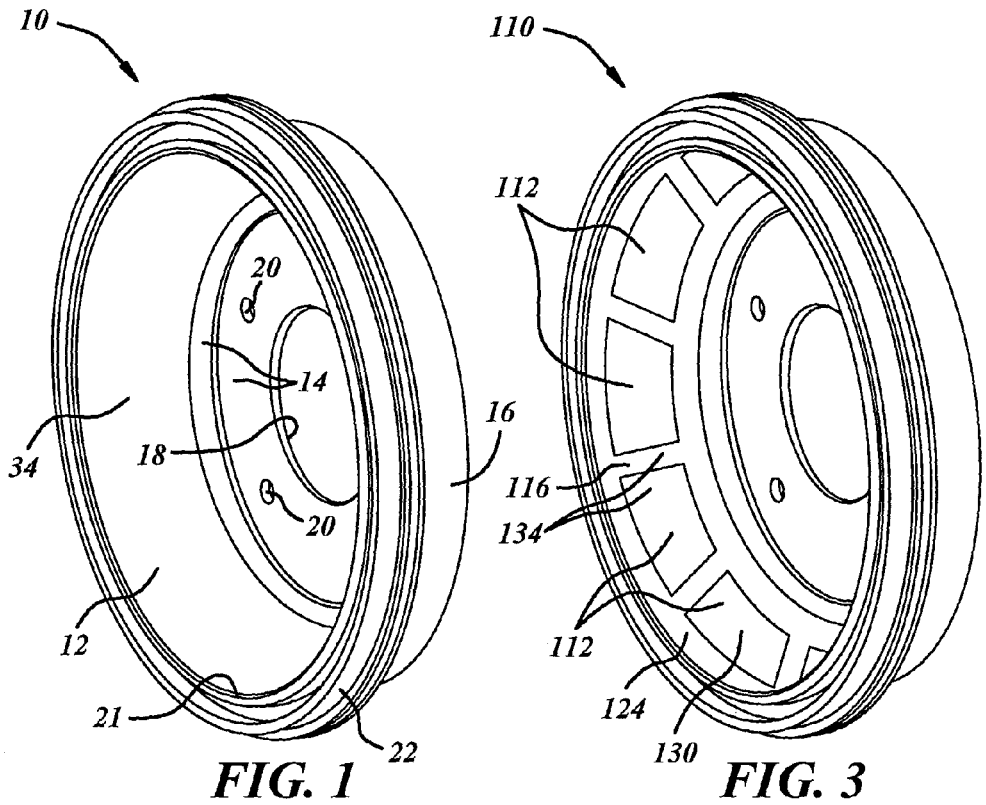
FIG. 1 is a perspective view of one embodiment of a drum having an inlay.
FIG. 3 is a perspective view of another embodiment of a brake drum having a plurality of inlays.
Figure 2:
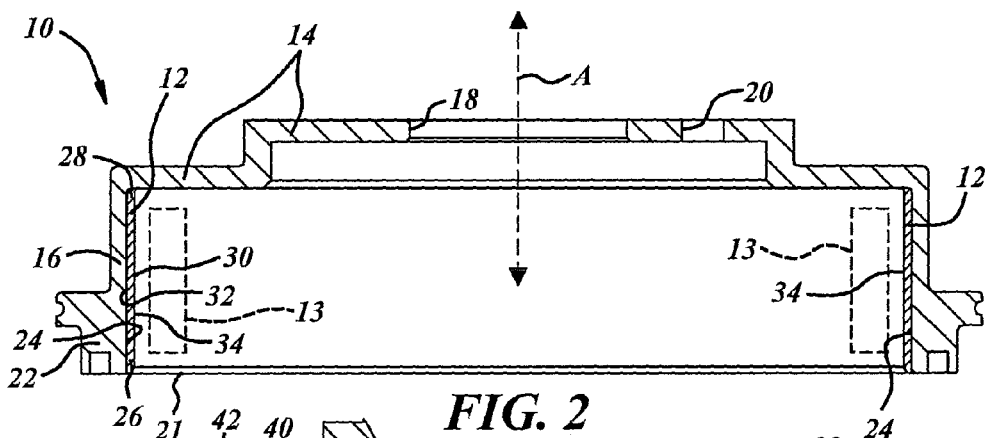
FIG. 2 is a cross-sectional view of the drum of FIG. 1.

The drum 10 may be mounted to an axle and may generate friction with a braking component such as a brake pad 13 (shown in phantom) when the brake pad is pressed against it during a braking event. The drum 10 may be made of a cast-iron, a steel, a ceramic, a polymer composite, an aluminum, or any other suitable material known by skilled artisans. Referring to FIGS. 1 and 2, the drum 10 may include a web portion 14 and a hoop portion 16 extending from the web portion. The web portion 14 may have an axle hole 18 and a plurality of bolt holes 20, both of which help mount the drum 10 onto the axle. The hoop portion 16 has an open end 21 and a labyrinth section 22 that is constructed to mate with a complementary structure of another component of the drum brake assembly. An inner surface 24 of the hoop portion 16 extends circumferentially around the hoop portion and axially therealong from the web portion 14 and to the open end 21.

The inlay 12 may be coupled to the inner surface 24 of the hoop portion 16 to help damp vibrations in the drum 10 and consequently help suppress sound and noise (e.g., ringing) emitted when the drum is vibrated. For example, relative sliding, movement, or other contact at an interface boundary formed between the hoop portion 16 and the inlay 12 generates friction therebetween which absorbs energy such as vibrations—so-called Coulomb damping. The interface boundary may be formed along the inner surface 24 of the hoop portion 16 (or the component body) and an opposing surface of the inlay 12 (e.g., mechanically distinguishable surfaces) that are in contact with each other but so that relative movement at the interface boundary generates friction and dissipates energy so as to reduce vibrations. As used herein, the term "inlay" does not necessarily require that the component is inserted into the drum 10, rather the component may be merely coupled to the drum.

In select embodiments, the inlay 12 may be made of a number of materials including, but not limited to, mild steel such as AISI 1010 steel and AISI 1008 steel, aluminum steel composites, stainless steel, titanium, various manganese alloys, metal matrix composites, or magnesium; the material may be a metal having a higher melting point than the material of the web portion 14 and the hoop portion 16. Some of the example materials listed above may be lighter in weight, and may be more wear-resistant than the material of the web portion 14 and the hoop portion 16. In these instances, use of the inlay 12 reduces the overall weight of the drum 10 because the inlay replaces what would otherwise be the material of the drum. Also, the drum may have a longer effective life.

In the exemplary embodiment of FIGS. 1 and 2, the inlay 12 may be a one-piece structure that is placed over the inner surface 24. The inlay 12 may be coextensive with the circumference of the inner surface 24 and may be coextensive with the axial length of the inner surface; in an embodiment not shown, the inlay 12 may not necessarily be coextensive with the axial length of the inner surface. The inlay 12 may have a first end 26 that is located near the open end 21, and may have a second end 28 that is located near the web portion 14. The inlay 12 may also have an outer surface 30 that is exposed to and faces the brake pad 13, and has an inner surface 32 that faces the inner surface 24 of the hoop portion 16. In this embodiment, the outer surface 30 constitutes a braking surface 34. The braking surface 34 is that surface which comes into contact with the brake pad 13 during a braking event. Friction is generated between the braking surface 34 and the brake pad 13 which slows or stops the automobile. In this embodiment, the outer surface 30 constitutes a majority of, and indeed, the entire braking surface 34 such that contact will be made only between the brake pad 13 and the inlay 12, and not between the brake pad and the hoop portion 16. In some cases, having the inlay 12 as the braking surface 34 may enhance vibration damping characteristics because the inlay directly contacts the brake pad 13 and thus sliding, movement, and/or other contact at the interface boundary is more intense than it might otherwise be if the inlay were not the braking surface. The more intense contact may absorb more vibrations.

Figure 4A:
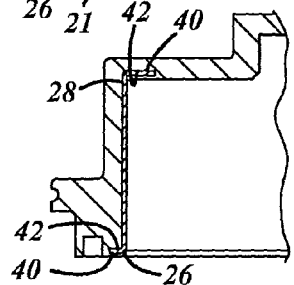
FIG. 4a is a fragmented cross-sectional view taken from a side of one embodiment of an inlay.
Figure 4B:
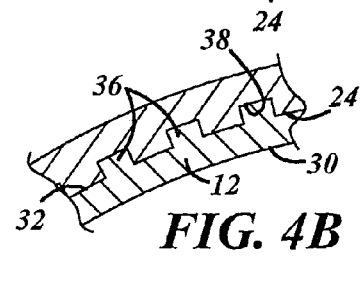
FIG. 4b is a fragmented cross-sectional view taken from a top of another embodiment of an inlay.

In one example assembly process, the inlay 12 is press-fit into a pre-cast hoop portion 16 in order to couple the two together. The inlay 12 may be made by a separate and distinct manufacturing process, and the web and hoop portions 14, 16 may be made by a separate and distinct casting process. The outer diameter of the inlay 12 may be dimensioned slightly smaller than the inner diameter of the hoop portion 16 such that the inlay can be force-fit into the hoop portion when the two are brought together coaxially. The inner diameter of the hoop portion 16 may be a result of casting dimensions or may be the result of machining. Referring to FIG. 4b, the inlay 12 may have a first attachment feature such as a plurality of ribs, one or more axial beads, or one or more axial splines 36 on its inner surface 32, and the hoop portion 16 may have a complementary second attachment feature such as recesses 38 on its inner surface 24 to help couple the inlay to the hoop portion. In this example, the first attachment feature is a projection that interfits with the second attachment feature to form a mechanical bond or coupling.

In another example assembly process, the inlay 12 is coupled to the hoop portion 16 by a cast-in-place process. The pre-formed inlay 12 may be placed in a mold cavity, and then may be manually or automatically positioned in the mold cavity such that, when completed, the inlay is the exposed braking surface 34. The mold cavity may then be filled with a molten material of the material used for the web and hoop portions 14 and 16. Injecting the molten material into the mold cavity is but one way of filling the mold cavity. Referring to FIG. 4a, in this process, the first attachment feature of the inlay 12 may be a single circumferential projection, such as a tab 40, a plurality of spaced-apart individual tabs, or the like. The tab 40 can extend from the first end 26, the second end 28, anywhere therebetween, or any combination thereof. The second attachment feature of the hoop portion may be a single complementary circumferential recess 42, a plurality of complementary spaced-apart individual recesses, or the like. Indeed, the first attachment feature may be the recess or recesses, while the second attachment feature may be the projection or projections. In any of these examples, one of the attachment features may be formed during the cast-in-place process. When the first attachment feature is a projection, the molten material solidifies over the projection to form the complementary recess. The resulting first and second attachment features thus interfit to form a mechanical bond or coupling that secures the inlay 12 and the hoop portion 16 together.

In yet another assembly process, the inlay 12 is coupled to the hoop portion 16 by a friction weld process. This may be performed in addition to the press-fit process. Once placed over the inner surface 24, a friction weld may be formed at an interface between the inner surface of the hoop portion 16 and the inner surface 32 of the inlay 12. The friction weld may only be formed at a portion of the interface, such as near the first end 26, so as to avoid adversely affecting vibration damping attributes therebetween by reducing relative sliding, for example. The friction weld may also be a number of separate friction welds that are spaced-apart with respect to each other.

As mentioned, using the inlay 12 as part of the drum 10 may help speed up the overall manufacturing process. For example, in a drum without the inlay 12, the inner surface 24 may have to be machined before use in an automobile. Because the inlay 12 is located over the inner surface 24, the inner surface need not be machined to such an extent, or at all.

In some embodiments, the inner surface 32 of the inlay 12 may be bonded to the inner surface 24 of the hoop portion 16 by adhesive bonding or any other suitable process. And in some embodiments, the projections may be similarly bonded to the recesses.

In some embodiments, the inner surface 32 or the inner surface 24 may be coated to form a layer that facilitates energy absorption between the inlay 12 and the hoop portion 16, and thus helps damp vibrations. Suitable coatings may include a plurality of particles which may be bonded to each other and/or to the particular surface by an inorganic binder, an organic binder, or another suitable bonding material. Suitable binders may include epoxy resins, phosphoric acid binding agents, calcium aluminates, sodium silicates, wood flour, or clays. In one embodiment, the coating may be deposited on the particular surface as a liquid dispersed mixture of alumina-silicate-based, organically bonded refractory mix. In other embodiments, the coating may include at least one of alumina or silica particles, mixed with a lignosulfonate binder, cristobalite ($SiO_2$), quartz, or calcium lignosulfonate. The calcium lignosulfonate may serve as a binder. In one embodiment, the coating may include any types of coating used in coating casting ladles or vessels, such as Ironkote or Ladlekote type coatings. In one embodiment, a liquid coating may be deposited on a portion of the particular surface, and may include high temperature Ladlekote 310B. In another embodiment, the coating may include at least one of clay, $Al_2O_3$, $SiO_2$, a graphite and clay mixture, silicon carbide, silicon nitride, cordierite (magnesium-iron-aluminum silicate), mullite (aluminum silicate), zirconia (zirconium oxide), or phyllosilicates. In one embodiment, the coating may comprise a fiber such as ceramic or mineral fibers.

Interface boundaries that may absorb energy and thus help damp vibrations may be formed with the coatings and may include, but is not limited to: the inner surface 24 of the hoop portion 16 against the layer formed, the inner surface 32 of the inlay 12 against the layer, the inner surface 24 against the particles or fibers, the inner surface 32 against the particles or fibers, and movement of the particles or fibers against each other.

The exact thickness of the coating may vary and may be dictated by, among other things, the materials used for the inlay 12 and for the hoop portion 16, and the desired degree of vibration damping. Examples of thicknesses may range from about 1μ-400 μm, 10 μm-400 μm, 30 μm-300 μm, 30 μm-40 μm, 40 μm-100 μm, 100 μm-120 μm, 120 μm-200 μm, 200 μm-300 μm, 200 μm-550 μm, or variations of these ranges.

Some examples of suitable particles or fibers that may be a part of a particular coating may include, but is not limited to, silica, alumina, graphite with clay, silicon carbide, silicon nitride, cordierite (magnesium-iron-aluminum silicate), mullite (aluminum silicate), zirconia (zirconium oxide), phyllosilicates, or other high-temperature-resistant particles. In one example, the particles may have a length as defined by the longest dimension in a range of about 1 μm-350 μm, or 10 μm-250 μm.

In an embodiment having a coating with particles, fibers, or both, the particles may have an irregular shape (e.g., not smooth) to augment vibration damping. The particles, fibers, or both, may be bonded to each other, to the inner surface 24 of the hoop portion 16, to the inner surface 32 of the inlay 12, or to both, because of, among other thins, the inherent bonding properties of the particles or fibers. For example, the bonding properties of the particles or fibers may be such that the particles or fibers may bind to each other or to the inner surface 24, to the inner surface 32, or to both under compression. In an example, the particles, fibers, or both, may be treated to provide a coating on the particles or fibers themselves, or to provide functional groups attached thereto to bind the particles together or attach the particles to at least one of the inner surface 24 or the inner surface 32. In another example, the particles, fibers, or both may be embedded in at least one of the inner surface 24 or the inner surface 32 to augment vibration damping.

In another embodiment, the particles, the fibers, or both, may be temporarily held together, held to the inner surface 32, the inner surface 24, or held to both, by a fully or partially sacrificial coating. The sacrificial coating may be consumed by molten metal or burnt off when metal is cast around or over the inlay 12. The particles, fibers, or both are left behind and trapped between the hoop portion 16 and the inlay 12 to provide a layer consisting of the particles, the fibers, or both.

In another embodiment, one or more of the inner surface 24 and the inner surface 32 may include a relatively rough surface including a plurality of peaks and valleys to enhance the frictional damping of the part. In this example, the inner surface 24, the inner surface 32, or both, may be abraded by sandblasting, glass bead blasting, water jet blasting, chemical etching, machining, or any other suitable process that may produce relatively rough surfaces.

In an embodiment where the inlay 12 is cast-in-place, the particles, fibers, or both may be exposed to the temperature of a molten material, and the inlay 12, the particles, the fibers, or all, may be made from materials that can resist flow and significant erosion during the casting process. For example, the inlay 12, the particles, the fibers, or all, may be composed of refractory materials that can resist flow and erosion at temperatures above 1100° F., above 2400° F., or above 2700° F. In an example casting process, when molten material is poured, the inlay 12, the particles, the fibers, or all, should not be wet by the molten material so that the molten material does not bond where an interface boundary would otherwise be formed.

In an embodiment where the drum 10 is made using a process that subjects the inlay 12, the particles, the fibers, or all, to relatively high temperatures associated with molten materials, the inlay 12, the particles, the fibers, or all, may be made from a variety of materials including, but not limited to, non-refractory polymeric materials, ceramics, composites, wood, or other materials suitable for frictional damping.

In another embodiment, a wettable surface may be provided that does not include a layer with particles or fibers, or a wettable material such as graphite is provided over a section of the inlay 12, so that the cast metal is bonded to the wettable surface in order to attach the inlay to the hoop portion 16 while still permitting frictional damping on the non-bonded surfaces.

Another exemplary embodiment of a drum 110 is shown in FIG. 3. This embodiment is similar in some ways to that described in FIGS. 1 and 2. One difference is a plurality of individual and distinct inlays 112. The inlays 112 may be spaced at a distance apart from each other and may be spaced circumferentially around a hoop portion 116. The inlays 112 may be inset into the hoop portion 116 such that an inner surface 124 of the hoop portion is flush with an outer surface 130 of each of the inlays. Thus, a braking surface 134 may include both the inner surface 124 and the outer surface 130 as a brake pad may come into contact with both during a braking event. In other embodiments, the inlays 112 need not necessarily be spaced apart at equal distances as shown, and there can be more or less of them than shown. Still in this embodiment, the outer surfaces 130 of the inlays 112 may constitute a majority of the exposed braking surface 134, though need not.

The above description of embodiments of the invention is merely exemplary in nature and, thus, variations thereof are not to be regarded as a departure from the spirit and scope of the invention.

What is claimed is:

1. A product comprising:
a drum for a drum brake assembly, the drum having a web portion and a hoop portion extending from the web portion; and
at least one inlay located at the hoop portion and constituting at least a portion of a braking surface contacting a braking component, the inlay and the hoop portion being constructed and arranged so that an inner surface of the hoop portion and an opposing surface of the inlay provide an interface boundary of mechanically distinguishable surfaces that are in contact with each other and so that relative movement of the inner surface of the hoop portion and the opposing surface of the inlay at the interface boundary generates friction and dissipates heat thereby damping vibrations using Coulomb damping in the drum when the drum is vibrated.

2. A product as set forth in claim 1 wherein the drum comprises a first material and the inlay comprises a second material that is different than the first material.

3. A product as set forth in claim 1 wherein the inlay is a single inlay circumferentially coextensive with the hoop portion, lying on a surface of the hoop portion, and constituting the entire braking surface contacting the braking component.

4. A product as set forth in claim 1 wherein relative movement at an interface formed between the drum and the inlay damps vibrations in the drum when the drum is vibrated.

5. A product as set forth in claim 1 wherein the drum has a first attachment feature and the inlay has a complementary second attachment feature interfitting with the first attachment feature to couple the inlay to the drum.

6. A product as set forth in claim 5, wherein the first attachment feature is a recess and the second attachment feature is a projection sized to fit within the recess.

7. A product as set forth in claim 5 wherein the first and second attachment features are at least one friction weld formed at an interface of the drum and the inlay.

8. A product as set forth in claim 1 wherein the inlay is formed with the drum by a cast-in-place process.

9. A product as set forth in claim 1 wherein the inlay is placed in the drum by a press-fit process.

10. A product as set forth in claim 9 wherein the inlay is formed with the drum by a cast-in-place process.

11. A product as set forth in claim 9 wherein the inlay is placed in the drum by a press-fit process.

12. A product comprising:
a drum for a drum brake assembly, the drum having a web portion and a hoop portion extending from the web portion; and
at least one inlay located at the hoop portion and constituting at least a portion of a braking surface contacting a braking component, the inlay and the hoop portion being constructed and arranged so that an inner surface of the hoop portion and an opposing surface of the inlay provide an interface boundary of mechanically distinguishable surfaces that are in contact with each other and so that relative movement of the inner surface of the hoop portion and the opposing surface of the inlay at the interface boundary generates friction and dissipates heat thereby damping vibrations in the drum when the drum is vibrated wherein the inlay includes a plurality of individual inlays circumferentially spaced around the hoop portion and each being inset in the hoop portion flush with a surface of the hoop portion so that the inlays and the surface constitute the braking surface contacting the braking component.

13. A product comprising:
a drum for a drum brake assembly, the drum comprising a first material and having a hoop portion; and
at least one inlay located at the hoop portion and comprising a second material that is different than the first material, the inlay constituting at least a majority of an exposed braking surface contacting a braking component, wherein relative movement between the drum and the inlay damps vibrations in the drum when the drum is vibrated.

14. A product as set forth in claim 13 wherein the inlay is a single inlay circumferentially coextensive with the hoop portion, lying on a surface of the hoop portion, and constituting the entire braking surface contacting the braking component.

15. A product as set forth in claim 13 wherein the inlay includes a plurality of individual spaced apart inlays circumferentially spaced around the hoop portion and each being inset in the hoop portion flush with a surface of the hoop portion so that the inlays and the surface constitute the braking surface contacting the braking component.

16. A product as set forth in claim 13 wherein the drum has a first attachment feature and the inlay has a complementary second attachment feature interfitting with the first attachment feature to couple the inlay to the drum.

17. A product comprising:
an automotive brake component; and
an inlay coupled to the automotive brake component and constituting at least a portion of a braking surface being acted upon during a braking event, the inlay damping vibrations using friction damping in the automotive brake component when the automotive brake component is vibrated.

* * * * *